Patented Nov. 13, 1951

2,574,843

UNITED STATES PATENT OFFICE 2,574,843

INSULATING FINISHING CEMENTS

Merwyn C. Randall, Philadelphia, Pa., and
George S. Gethen, Collingswood, N. J.

No Drawing. Application April 4, 1949,
Serial No. 85,478

5 Claims. (Cl. 106—104)

This invention relates to an insulating finishing cement, and more particularly to an insulating finishing cement which is characterized by a combination of insulating and finishing properties and early setting characteristics together with high early resistance to weather effects such as rainfall. While the insulating finishing cement of the present invention is particularly adapted to outdoor applications it is in no way excluded from inside use particularly where early setting properties are desirable or required as compared to the relatively longer setting periods involved in the use of insulating cements of the type described in our copending application Serial Number 48,935 filed under date of September 11, 1948, now Patent No. 2,516,342.

In our copending application referred to above, we have disclosed a novel insulating finishing cement which has the combined properties of thermally insulating a base surface while firmly adhering thereto and providing a smooth, hard outer surface in a single application. While the compositions of said prior invention have unexpected beneficial properties, their use is limited to applications where the surface is protected because they are often either washed away or suffer surface damage if they are exposed to rainfall shortly after application. This characteristic, which likewise exists in most ordinary cements, is detrimental when the cement is used outdoors because of the high cost of protecting a newly applied cement surface from the elements.

It is therefore an object of this invention to provide an insulating finishing cement which resists the action of rainfall, moisture, snow, sleet, ice and the like a short time after the cement is applied. It is also an object of our invention to provide a weather resistant cement which has a low density, a smooth, nonporous surface, excellent thermal insulating properties and resistance to break-down at temperatures of the order of 1200° F. and higher. A still further object is to provide a weather resistant outside insulative finishing cement that adheres firmly to previously applied layers of the same composition or other insulating or base materials to be covered and without special preparation of the base or the necessity of reinforcement such as wire mesh. Another object is to provide a weather resistant insulating cement that has high workability, low shrinkage, does not crack upon drying, nor upon thermal expansion or contraction, and that can be made in a single coat application without the necessity of further protection. It is also an object of this invention to provide a weather resistant insulating cement that dries with a self-sizing finish, that does not corrode metal and that is in a condition when dry to be painted, to obtain without sizing desired color effects with a single paint coat application.

The foregoing and other objects of the present invention are attained by means of a composition containing essentially bentonite, aluminous cement, fly ash, and a mineral wool. In addition to the ingredients described above, we may incorporate small amounts of other materials such as certain water soluble lignins as hereinafter described. When the constituents of our cement are mixed with cold water, a plastic mass of workable consistency is attained. When this plastic mass is applied outdoors on a base of insulating board, magnesia block or other base materials to be coated it sets rapidly to form a cement of low thermal conductivity having very little shrinkage and possessing a smooth, hard surface. Approximately two hours after application the finished surface cement will withstand a hard rainfall without material change in surface characteristics. One of the surprising characteristics of the cement of the present invention is that it adheres tenaciously to "Monoblock" which is a well known rock wool insulation block manufactured by Baldwin-Hill Company of Trenton, New Jersey. This characteristic is of great importance because the prior art cements do not adhere satisfactorily to "Monoblock" whereas tests have shown that the compositions of the present invention have an adhesion factor on "Monoblock" of substantially 9.3 pounds per square inch.

The raw materials of the compositions of our invention consist of commercial materials normally available at relatively low cost. The aluminous cements of this invention are characterized by the fact that they contain a high percentage of aluminum oxide as compared to the aluminum oxide content of Portland cement. They are manufactured by fusing (occasionally by sintering) a mixture of bauxite and limestone at temperatures from about 1550° C. to about 1600° C. The term aluminous cement as used throughout this specification and claims is specifically limited to high aluminum oxide cements whose chemical analysis falls within the ranges set forth in the analysis below. An analysis of a typical Portland cement is included to illustrate the wide difference in composition between the aluminous cements of the present invention and other cements. While Portland cement may be added in minor amounts to the mix of our composition, it is essential that the major proportion of the cementitious ingredients be aluminous cement.

Analysis

|  | Portland Cement | Aluminous Cement |
|---|---|---|
|  | Per cent | Per cent |
| $SiO_2$ | 21.2 | 5.1– 7.0 |
| $Al_2O_3$ | 5.4 | 36.0–41.9 |
| $Fe_2O_3$ | 3.3 | 4.0–12.0 |
| $FeO$ |  | 1.7–10.5 |
| $TiO_2$ | 0.2 | 1.7– 2.0 |
| $CaO$ | 64.4 | 36.6–40.3 |
| $MgO$ | 0.8 | 0.2– 1.4 |
| $Na_2O$ | 0.4 | 0.1 |
| $K_2O$ | 0.6 | 0.3 |
| $SO_3$ | 2.3 | 0.0– 1.2 |
| $H_2O$ and $CO_2$ | 1.4 |  |

The bentonite in the compositions of the present invention is customarily designated as a native colloidal clay or as a sodium montmorillonite. It has the property of swelling in the presence of water to a volume several times its original volume but its swelling characteristic is normally destroyed by admixture with basic compositions containing calcium compounds or their equivalents. This is apparently caused by an ion exchange reaction involving calcium ions and the sodium montmorillonite component of bentonite.

In combination with the aforementioned ingredients we employ a finely divided fly ash. The term "fly ash" as used in the present specification is intended to indicate the finely divided ash residue produced by the combustion of pulverized coal which ash is carried off with the gases exhausted from the furnace in which the coal is burned and which is collected from these gases usually by means of suitable electrical or mechanical precipitators. It is recognized in the literature that fly ash is a pozzolanic material. As such it has been added to lime mortars in partial substitution for sand and to Portland cements, but so far as we know there has been no suggestion that a pozzolanic material in conjunction with aluminous cement and bentonite would provide a composition having characteristics entirely different from the prior art cements.

Another raw material used in the practice of the present invention is a mineral wool. We prefer to use a specific mineral wool commercially available as rock wool which contributes excellent heat insulation, fire resistance and pliability to the final cement, particularly when pretreated as hereinafter described. More particularly we prefer a specially fluffed and graded mineral wool or rock wool which may be manufactured in accordance with our novel processes discussed below.

While the incorporation of further materials is not a requisite of the present invention, we prefer to add an agent to the mix to combat the tendency of the cement to produce a crystalline chemical deposit at its outer surface. It is accordingly preferred to add a small quantity of a water-soluble lignin compound to the inventive combination of aluminous cement, bentonite, fly ash, and mineral fibers. The water-soluble lignin compound which we add to our composition is selected from the group of compounds which includes the alkali metal and alkaline earth metal salts of ligno sulfonic acid. By way of example the following specific lignin compounds are commercially available and may be employed in the practice of our invention: Calcium-magnesium ligno-sulfonate, sodium ligno-sulfonate, calcium ligno-sulfonate.

In the preparation of the present outdoor insulating finishing cement compositions the aluminous cement, fly ash, bentonite, and mineral wool are preferably mixed in a dry state. The blending of the dry, solid ingredients is attained by simple mechanical agitation or by machine blending in an apparatus of the ribbon blender type in which the rotation of a shaft sets a connected ribbon in motion with resultant intimate mixing of solids contacting the moving ribbon. Other mechanical blenders capable of mixing dry powders and fibers will likewise be found to be workable. After blending, the dry mix may be stored and transported in bags to the situs of application. Compositions of the present invention may be applied on the job by mixing the dry composition thoroughly with cool water or cold water to a convenient plastic consistency, applying the cement to the base member being coated, and then troweling or otherwise smoothing the outer surface. The plastic mix should preferably be applied within about one hour after adding water because the matrix may otherwise set before application and to some extent impair the final strength of the material.

An outside insulating finishing cement having high insulating value and outstanding finishing and weather resisting qualities is made in accordance with this invention by incorporating specially fluffed and graded mineral wool into the composition. In the preparation of ordinary commercial rock wool the fibers are compressed in a felted state and run through revolving screens to remove dense spherical particles. The rotary motion forms the rock wool fibers into small spherical, fibrous clusters. When these fibrous clusters are used in an insulating cement the clusters retain their shapes and are not penetrated or filled in by the finely divided components of the mixture. Since some of the fibrous clusters are about ½ inch in diameter they impair the smooth, hard property of a finished surface, thus producing the rough surface characteristic of the prior art insulating cements containing rock wool. For this reason the insulating cements of the prior art are not classed as finishing cements.

In order to preserve the advantageous bulking action of rock wool and obtain a smooth, hard surface at the same time we have prepared, as a preferred embodiment of the present invention, a composition which contains a specially fluffed and graded rock wool. Such rock wool is a loose, fluffy and graded rock wool which may be prepared by several methods such as by picking the aforementioned fibrous clusters in a carding machine or by means of spiked rolls travelling in opposite directions of rotation or at different speeds in the same direction to loosen the individual fibers and grade the rock wool clusters between the rolls. When the fluffy rock wool is mixed with the cementitious ingredients of the insulating finishing cement of this invention, the fluffy effect of the clusters is retained sufficiently by their configuration to prevent the surrounding cementitious ingredients from mixing intimately with the rock wool fibers. At the same time the picking operation fluffs the fibrous clusters thereby loosening individual fibers near the surface and affording binding of individual loosened fibers at the surface of the clusters with the cementitious ingredients while still preserving the bulking action of the rock wool clusters attributable to their pliable fiber content. Therefore, our outside insulating finishing cement containing fluffed and graded rock wool may be troweled to a smooth, relatively hard surface and has nevertheless remarkable insulating properties and is capable of expanding and contracting without cracking. The characteristic of early weather resistance, which so far as we are aware is unique in a cement which also has good insulating and finishing properties, is attributable to the interaction of the individual components of our composition but this result is an unexpected one and its cause is not apparent from the known properties of the ingredients taken alone.

While the specific mineral wool known as rock wool has been used in the foregoing description of our fluffing and grading processes, it will be understood that these processes are similarly applicable to artificial and synthetic fibers to form a fluffed material having the bulking action referred to above.

The ingredients of our novel compositions may be blended in widely varying proportions with beneficial results, but we have found that certain proportions of the essential constituents produce particularly desirable cements having the characteristics referred to above. We have found that the amount of one particular ingredient to be added depends upon the quantity of some other ingredient already present. Specifically, we have found that it is desirable to add from 1 to 4 parts by weight of aluminous cement to one part by weight of bentonite, and that for most compositions particularly desirable results are attained when this ratio is held within the limits of two or three parts aluminous cement to one part bentonite. The optimum proportion of fly ash to the other ingredients in our composition is dependent upon the combined weight of bentonite and aluminous cement present but should generally be held within the limits of 0.5 to 1.5 times the combined weight of bentonite and aluminous cement. The quantity of mineral wool to be incorporated in the composition depends on the total weight of the other constituents, regardless of their respective proportions, and workable limits fall within the range of 33% to 100% mineral wool based on the combined weight of bentonite, aluminous cement, and fly ash. Particularly desirable compositions are attained when the mineral wool content is restricted to 42%–67% on the same basis.

An example of a particularly effective composition is as follows:

| Material: | Per cent by weight |
|---|---|
| Bentonite | 10 |
| Aluminous cement | 26 |
| Fly ash | 28 |
| Mineral wool (fluffed and graded) | 36 |

As an example of a particularly useful aluminous cement we have successfully employed a product known in the art as "Lumnite" cement manufactured and sold by the Lumnite Corporation. It will be understood, however, that other aluminous cements as defined above may be used. Our experiments have shown that when substantial quantities, for example if 25% of aluminous cement is added to compositions of our aforementioned prior invention the aluminous cement is not compatible with starch and the starch-bentonite-Portland cement-aluminous cement mix produces an objectionable and very watery, wet, rope-like mass. However, in the absence of starch, Portland cement may be used in a mix without seriously affecting the desired character although there is no satisfactory setting time obtained with this material. Since the prime purpose of the present invention is to develop a material that has a satisfactory early set when used outdoors and exposed to weather conditions such as rain, sleet, snow and the like, it is obvious that Portland cement alone is not a satisfactory ingredient. The use of aluminous cement such as "Lumnite" cement controls the problem of setting time. However, aluminous cement would be expected to work adversely in the presence of bentonite and it is this ability of these two materials to work together that gives the surprising result that has been obtained. Portland cement, however, can be added to the mixture, if desired, in minor amounts, although there is no technical advantage derived from this inclusion. Further addition of Portland cement appears to break down the body of the mix and the product assumes the appearance of a mass of wet, nonplastic mineral fibers. Similarly, it might be expected that aluminous cement would not work satisfactorily in the presence of bentonite. Free calcium oxide and alkaline calcium compounds generally attack bentonite and eliminate its tendency to swell. It is therefore surprising that a low-density, highly workable cement is attained by mixing an aluminous cement with bentonite, fly ash, and a mineral wool and that it sets rapidly without shrinking or cracking to a smooth hard surface which very quickly becomes weather resistant while retaining its unusual elasticity and thermal insulating properties with high adhesion to base materials. The precise reason for this phenomenon is not clear to us but it appears probable that the presence of fly ash in combination with bentonite and an aluminous cement catalyses a reaction which normally does not take place between bentonite and an aluminous cement and further greatly modifies and depresses the occurrence of the usual ion-exchange type reaction involving bentonite. The unique insulating finishing cement of the present invention results when this reaction takes place in the presence of a bulking material such as mineral wool.

While we are aware that finishing cements, insulating cements, and outdoor cements are known in the prior art, we believe that the present invention is unique and provides the first cement which eliminates the necessity of especially prepared base surfaces such as wet or dry, painted, stone, stucco, wood or the like, and which also eliminates the necessity of a wire mesh reinforcement. Moreover, the present invntion provides a composition which can be supplied in commercial quantities. A smooth, hard, weather resistant, non-shrinking, self-sizing finish is obtained with a single coat application comprising a cement having a high thermal efficiency and capable of withstanding high temperatures. This cement develops high adhesion with all base materials without cracking and has excellent workability with early setting properties and good coverage. Moreover, it does not necessarily require further protective coatings such as canvas or water proofing. Such finish when dry resists cracking from expansion and contraction, does not dust or bloom and may be painted for color effects.

While the present invention has been described in terms of certain preferred materials, it will be understood that it is not intended to limit the invention to the specific ingredients disclosed, except where this has been indicated in the above description. It should be particularly noted that equivalent pozzolanic materials may be used in place of the fly ash disclosed.

Having thus described our invention, we claim:

1. An insulating finishing cement comprising by weight aluminous cement at least $\frac{1}{10}$, bentonite at least $\frac{1}{25}$, mineral wool not less than $\frac{1}{4}$ nor more than $\frac{1}{2}$, and fly ash not less than $\frac{1}{6}$ nor more than $\frac{9}{20}$.

2. An insulating finishing cement comprising by weight: Bentonite, 1 part; aluminous cement, 1 to 4 times the weight of bentonite; fly ash, 0.5 to 1.5 times the combined weight of bentonite and aluminous cement; and mineral wool in an amount corresponding to $\frac{1}{3}$ to 1 times the combined weight of said bentonite, aluminous cement, and fly ash.

3. The invention of claim 2 further characterized by the fact that said mineral wool is fluffed.

4. An insulating finishing cement comprising by weight, bentonite, 1 part; aluminous cement, 2 to 3 parts, fly ash, 0.5 to 1.5 times the combined weight of bentonite and aluminous cement; and a fluffed and graded mineral wool in an amount corresponding to 42%–67% the combined weight of said bentonite, aluminous cement, and fly ash.

5. An insulating finishing cement comprising substantially 10% bentonite, 26% aluminous cement, 28% fly ash and 36% fluffed mineral wool.

MERWYN C. RANDALL.
GEORGE S. GETHEN.

REFERENCES CITED

The following references are of record in the file of this patent:

UNITED STATES PATENTS

| Number | Name | Date |
|---|---|---|
| 2,096,242 | Harshberger | Oct. 19, 1937 |
| 2,421,721 | Smith | June 3, 1947 |
| 2,446,990 | Schuetz | Aug. 10, 1948 |
| 2,509,599 | Hollenberg | May 30, 1950 |